United States Patent

Savkar et al.

[11] Patent Number: 5,843,232
[45] Date of Patent: Dec. 1, 1998

[54] MEASURING DEPOSIT THICKNESS IN COMPOSITE MATERIALS PRODUCTION

[75] Inventors: Sudhir Dattatraya Savkar, Schenectady; Robert David Lillquist, Niskayuna; Russell Scott Miller, Ballston Spa, all of N.Y.

[73] Assignee: General Electric Company, Schenectady, N.Y.

[21] Appl. No.: 554,323

[22] Filed: Nov. 2, 1995

[51] Int. Cl.⁶ .............................. C23C 4/00; G01B 11/06
[52] U.S. Cl. .................... 115/712; 118/723 R; 118/730
[58] Field of Search .............. 427/10, 455, 456, 427/527, 576; 118/712, 713, 723 R, 730; 436/164, 171; 438/16; 204/192.13, 298.03; 359/350, 359, 589; 374/7; 250/341.8, 358.1; 356/357, 381, 382; 428/293.1, 549; 419/4, 8, 9, 17

[56] References Cited

U.S. PATENT DOCUMENTS

| | | | |
|---|---|---|---|
| 3,620,814 | 11/1971 | Clark et al. | 427/10 |
| 4,634,291 | 1/1987 | Bontel et al. | 374/7 |
| 4,656,331 | 4/1987 | Lillquist et al. | 219/121.47 |
| 5,047,612 | 9/1991 | Savkar et al. | 219/121.47 |
| 5,229,165 | 7/1993 | Das et al. | 427/456 |
| 5,387,309 | 2/1995 | Bobel et al. | 427/10 |
| 5,460,774 | 10/1995 | Bachlet et al. | 419/4 |
| 5,551,983 | 9/1996 | Shepard, Jr. et al. | 118/723 R |

FOREIGN PATENT DOCUMENTS

| | | |
|---|---|---|
| 3-44842 | 2/1991 | Japan . |
| 6-34328 | 2/1994 | Japan . |

*Primary Examiner*—Jeffrey E. Russel
*Attorney, Agent, or Firm*—Patrick K. Patnode; Marvin Snyder

[57] ABSTRACT

This invention relates to novel apparatuses for measuring deposit thickness during composite materials production. More particularly, this invention uses a composite's emission signature or a composite's reflectance signature, to measure deposit thickness.

32 Claims, 7 Drawing Sheets

MEASURING DEPOSIT THICKNESS IN COMPOSITE MATERIALS PRODUCTION

BACKGROUND OF THE INVENTION

This invention relates generally to measuring deposit thickness in composite materials production. More particularly, this invention uses a composite's infrared emission signature or a composite's reflectance signature, to measure deposit thickness.

Typically in composite material production processes which involve coating various substrate materials with protective coatings, particulate matter is injected into a plasma plume which is directed at the substrate. The substrate and particulate matter are typically metal with the particulate matter forming a complex protective coating on the substrate. This protective coating often exhibits superior properties of wear resistance or resistance to corrosion.

A significant problem associated with composite materials production has been the difficulty in determining the thickness of deposition on a substrate surface. The use of plasma in composite materials production presents an extremely hostile environment to work with. First, plasma usage involves extremely high temperatures. Additionally, plasma usage involves metal powder and hostile vapor being directed at the workpiece surface. Further complicating composite materials production is the extreme size of the vacuum enclosure required for the production system. Because of the many complications involved with plasma usage, an accurate measurement of deposit thickness has been extremely hard to come by.

Several techniques are currently in use to measure deposit thickness during composite materials production. One technique utilizes laser interference. However, laser interference techniques are often ineffective because of the length of the optical path which must be traversed in the large dimensioned vacuum enclosures used in composite materials production. Additionally, laser interference techniques are further hindered by the presence of metal powder and vapor injected during plasma usage.

A second technique for measuring deposit thickness has been to place a series of locating sensors within the spray tank. However, having locating sensors within the spray tank is made extremely difficult by the high temperatures involved in plasma usage, along with the typical wobble of the mandrel, which holds the workpiece.

It is apparent from the above that there exists a need in the art for an apparatus for measuring deposit thickness during composite materials production, which is non-intrusive. By remaining non-intrusive, this apparatus would avoid the problems associated with plasma usage, such as extreme temperatures and the presence of metal powder and vapor. It is a purpose of this invention, to fulfill this and other needs in the art in a manner more apparent to the skilled artisan once given the following disclosure.

SUMMARY OF THE INVENTION

The above-mentioned needs are met by the instant invention which relates to novel apparatuses for measuring deposit thickness in composite materials production. More particularly, this invention uses a composite's emission signature or a composite's reflectance signature, to measure deposit thickness.

In a first preferred embodiment, the instant invention uses an infrared imaging means to measure deposit thickness by correlating the reduction in workpiece intensity, due to the reduction in surface emissivity, with deposit thickness through a previously established correlation.

In a second preferred embodiment, the instant invention uses a camera means to measure deposit thickness by correlating the increase in workpiece intensity, due to the increase in surface reflectance, with deposit thickness through a previously established correlation. This embodiment monitors the reflectance of background radiation provided by the plasma source.

In a third preferred embodiment, the instant invention uses a camera means to measure deposit thickness by correlating the increase in workpiece intensity, due to the increase in surface reflectance, with deposit thickness through a previously established correlation. This embodiment monitors the reflectance of background radiation provided by an external light source.

The preferred apparatuses for measuring deposit thickness during composite materials processing, offer the following advantages: good economy, ease of use; excellent speed;

and non-intrusiveness. In fact, in many of the preferred embodiments, these factors of economy, use, speed and non-intrusiveness, are optimized to an extent considerably higher than heretofore achieved in prior, known apparatuses for measuring deposit thickness in composite materials production.

Other objects and advantages of the instant invention will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

The instant invention is directed to apparatuses for measuring deposit thickness in composite materials production.

More particularly, this invention uses a composite's emission signature or a composite's reflectance signature, to measure deposit thickness.

An increase in the trapping of incident radiation occurs when the optical roughness of a surface, determined by the fiber diameter and fiber spacing, is greater than the wavelength of the light used. This increases the absorption capability of the workpiece surface, thereby increasing the emissivity of the workpiece surface.

Figure 1:
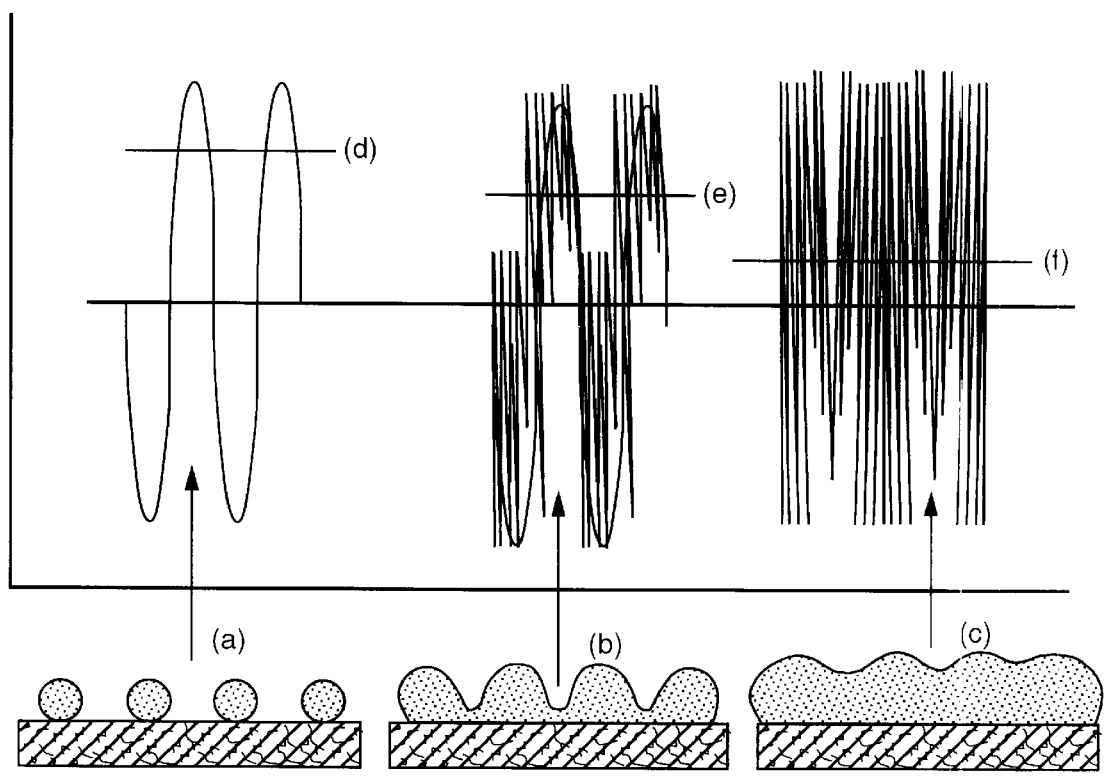
FIG. 1 is a schematic showing that the strength of the amplitude of a video signal from the fiber covered surface is a function of the fiber diameter and spacing.

For properly chosen wavelengths, this emissivity varies as a function of the crests and troughs formed during deposition over the fiber surfaces. The emissivity of the low points of the target surface, the troughs created between fibers, have a much higher emissivity reading than the crests of the fibers do. This variation in the emissivity can be correlated with the deposit thickness. As seen in FIG. 1, when a clearly defined roughness pattern is examined, emissivity readings for this pattern show a consistent relationship between the strength of the signal received and the location on the workpiece being examined.

Figure 2:
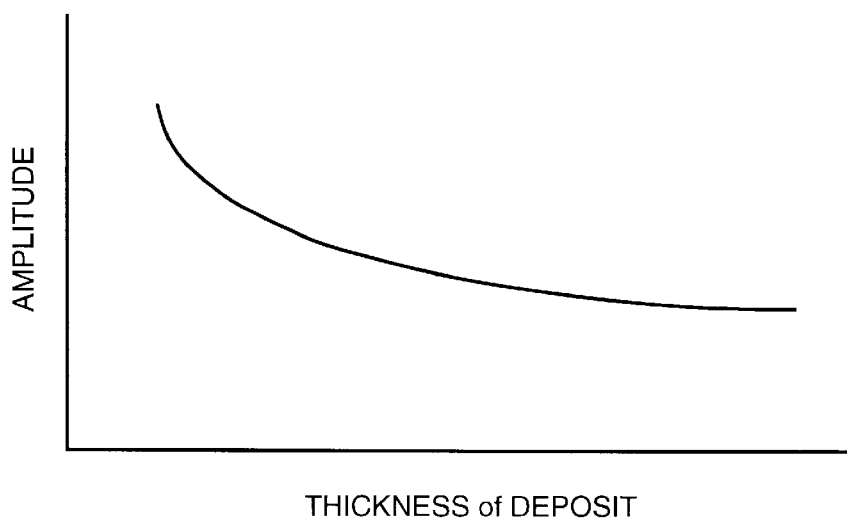
FIG. 2 is a graph showing the correlation between the emissivity of the workpiece surface and the thickness of the deposited material.

All clearly defined roughness patterns have high points and low points, crests and troughs, as seen in FIG. 1, position A. FIG. 1 position A, shows that the strength of a video signal is a function of the roughness pattern being examined. High emissivity readings are found in the low points of the workpiece, between the fibers, and low emissivity readings are displayed in the high points of the workpiece, on the tops of the fibers for example. As the deposit thickness increases and the spaces between the fibers fill in (position B and position C in FIG. 1), the variation in the strength of the video signal decreases and the pattern observed becomes less well defined. The mean levels of the amplitude peaks (positions d, e, and f in FIG. 1) are then used to form the correlation seen in FIG. 2. As seen in FIG. 2, the correlation of the output versus the build up of deposited material vanishes once the deposit becomes relatively smooth. Accordingly, a reduction in workpiece intensity, due to the reduction in surface emissivity as the spaces between the fibers are filled with deposition, can be related to the deposit thickness through a previously established correlation.

As the deposited material thickens, smoothing out the fiber based crests and troughs, the readings of an infrared imaging means become less well defined due to the reduction in surface emissivity and a corresponding reduction in workpiece intensity. This observation provides the basis for the first embodiment of the instant invention. A semi-empirical relation between deposit thickness and intensity variations due to emissivity changes can be readily developed. This relation will generally assume a graphical form like that shown in FIG. 2.

In the typical case of metal matrix composites, silicon carbide fibers between 125 microns and 200 microns are used. These fibers are wound on a metal mandrel with a spacing between the centers approximately of two fiber diameters. It follows, therefore, that the emission signature of the deposit will reflect the "roughness of the deposit" in its various stages as the spaces between the fibers get filled in. The rough contour of the underlying fibers is maintained for quite some thickness of the deposit, allowing for the development of the relation referred to above.

Figure 3:
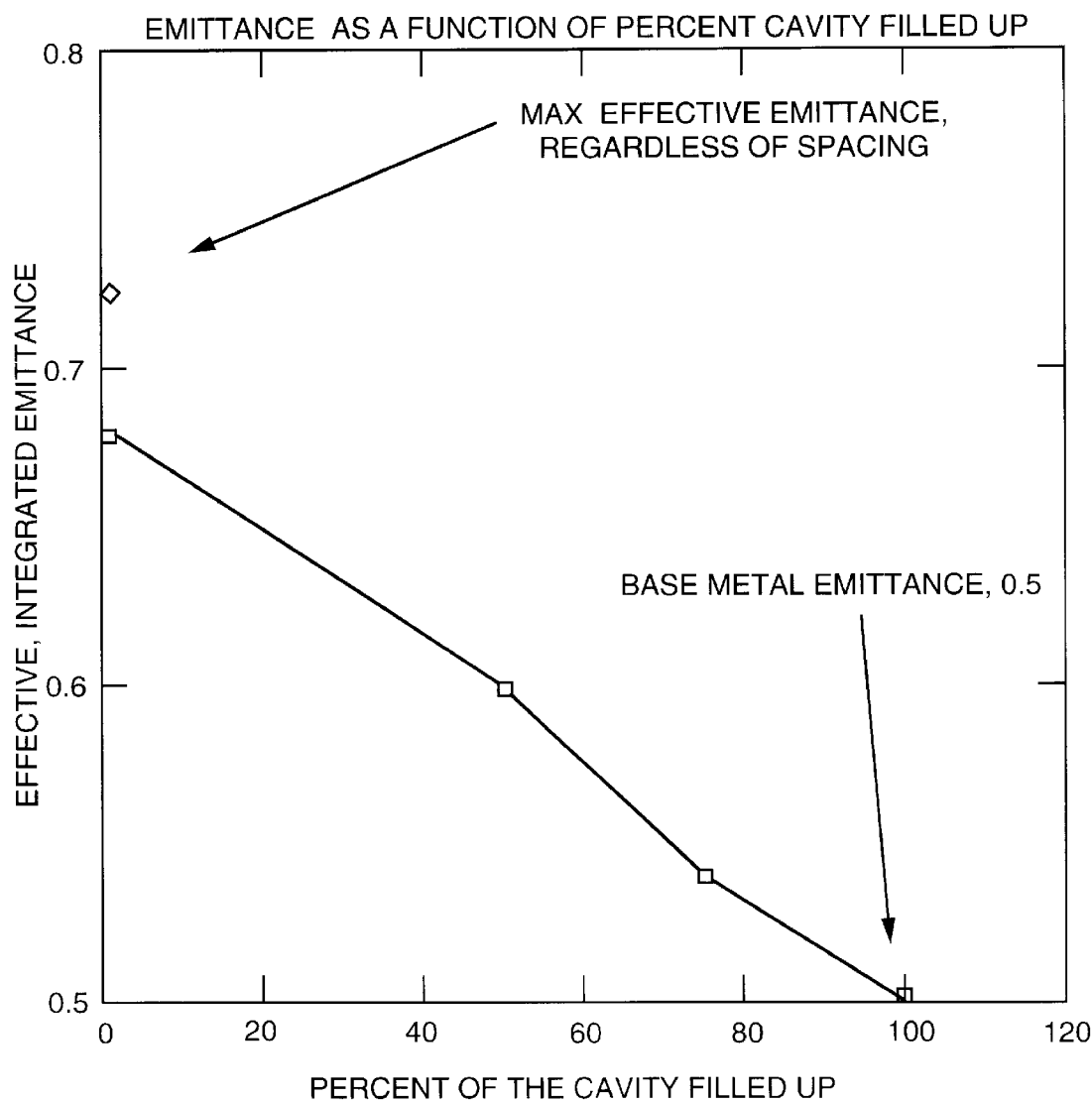
FIG. 3 is a graph showing the change in emissivity of a series of row cavities.

The change in emissivity and the intensity due to the filling of the spaces between the fibers may be estimated using the method outlined in R. E. Bedford's "Effective Emissivities of Blackbody Cavities—A Review,", from *Temperature: Its Measurement and Control in Science or Industry*, Volume 4, Part 1, ISA (Pittsburgh, Pa.) 1972. FIG. 3 shows the change in the emissivity of a series of row cavities, simulating the cavities formed by the fibers, as the cavities fill up. A fiber spacing to diameter ratio of 2, and a base material emissivity of 0.5 were used for this estimate. This estimate applies only until the cavities are effectively filled up (simulating the build up of the deposit to the point where the undulations caused by the fiber are no longer carried through the deposit and the surface is smoothed out by the continuous build-up). Once the cavity is filled up, the emissivity will be that of the base metal being sprayed. Therefore, it follows that the exact correlation discussed above should be experimentally obtained.

These calculations suggest that the emissivity of the deposit, as it smoothens out, changes by about 35% which is a substantial and measurable difference. The large scale variation in emissivity will disappear as the deposit fills the inter-fiber spaces. Therefore, this technique is relatively immune to spatial and temporal variations in the target temperature.

Figure 4:
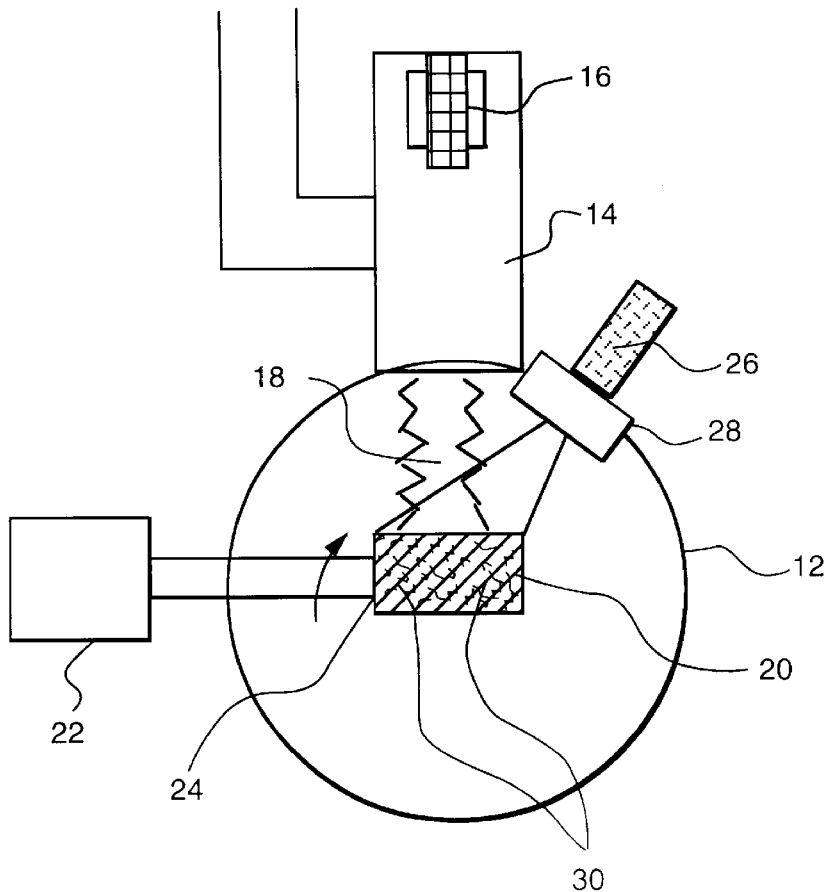
FIG. 4 is a schematic of a first embodiment of the instant invention.

Referring now to FIG. 4 of the drawings, a first embodiment of the instant invention is depicted. An apparatus for measuring deposit thickness on a workpiece 20 having a well defined roughness pattern, during composite materials production is shown, including a spray tank 12, which separates the spraying process from the surrounding environment. A plasma source 14, often a plasma gun, is shown adjacent spray tank 12, with a powder injector 16 positioned therein for injecting a powder comprising a plurality of particles into a plasma plume 18.

The powder injected into plasma plume 18 may be of any type known to be suitable for use in plasma spray deposition processes, including both metallic and ceramic powders. The powder is brought to a molten state by plasma source 14 and impinges onto and adheres to workpiece 20, thus forming deposition on the target surface of workpiece 20. Workpiece 20 has a well defined roughness pattern and often comprises a plurality of fibers 30 wrapped about a mandrill 24.

Additionally, a manipulator 22 is shown rigidly attached to mandrill 24. Manipulator 22 rotates mandrill 24 such that workpiece 20 can be completely exposed to plasma plume 18, generated from said plasma source 14.

The system further includes an infrared imaging means 26 positioned external to spray tank 12, and positioned to view the entire deposit surface of workpiece 20, often through a window 28 provided in the wall of spray tank 12. Material for window 28 should allow radiation in a wavelength within the range of interest to pass through to infrared imaging means 26. An example of appropriate material for window 28 is sapphire. Infrared imaging means 26 is often an infrared imaging radiometer or an infrared camera. Infrared imaging means 26 is tuned by a combination of detector selection and spectral filtering to respond only to wavelengths which are passively emitted by workpiece 20 itself.

Often, infrared imaging means 26 effective wavelength response (detector+filter+optics+windows) excludes wavelengths less than approximately 3 microns to eliminate plasma background radiation interference. Infrared imaging means 26, in one preferred embodiment, is an infrared sensor of the type disclosed in commonly assigned U.S. Pat. No. 4,656,331, entitled, "Infrared Sensor For The Control Of Plasma-Jet Spray Coating and Electric Arc Heating Processes", the disclosure of this patent incorporated in its entirety herein by reference. An infrared sensor of this kind should preferably employ a rectangular array of cryogenically cooled mid-infrared photon detectors such as indium antimonide or mercury cadmium telluride, and should be filtered in a manner known in the art to respond only to infrared radiation wavelengths longer than approximately three (3) microns.

An example of a suitable commercially available infrared imaging radiometer is an AGEMA 870 IR imaging radiometer using a mercury cadmium telluride detector optimized for 2.0–5.0 micron response coupled to a 4.8 micron long-pass filter or a 3.5–4.0 band pass filter to reduce the plasma radiation background interference.

In application, an infrared imaging radiometer has an advantage over a generic infrared camera when used as infrared imaging means 26, in that an infrared imaging radiometer permits an accurate absolute intensity measurement of workpiece 20 from which the deposit surface temperature can be derived, in addition to measuring deposit thickness.

An example of a suitable infrared camera is one using a pyroelectric video detector filtered to block wavelengths less than 3 micrometers to reduce the plasma radiation background interference.

Infrared imaging means 26 monitors the wavelengths which are passively emitted by workpiece 20. Infrared imaging means 26 identifies any reduction in the intensity of workpiece 20 due to a reduction in surface emissivity as the spaces between fibers 30 are filled with deposition. This reduction in the intensity of workpiece 20 and corresponding reduction in workpiece 20 emissivity can be related to the deposition thickness on workpiece 20 using a previously established correlation, as discussed above.

In operation, plasma source 14 projects plasma plume 18 upon workpiece 20 depositing particulate upon the surface of workpiece 20, often including fibers 30. Manipulator 22 rotates mandrill 24 which holds workpiece 20, such that workpiece 20 is completely exposed to plasma plume 18. Spray tank 12 separates the operation from the surrounding environment. Infrared imaging means 26, positioned outside of spray tank 12, monitors the intensity of workpiece 20 through window 28. Infrared imaging means 26 is filtered such that it only responds to radiation wavelengths longer than three micrometers, thereby screening out infrared wavelengths emitted by plasma plume 18. When the surface of workpiece 20 is rough, the emissivity of workpiece 20 varies as a function of the crests and troughs created by fibers 21 (See FIGS. 1, 2, & 3). However, as the material is deposited upon the surface, and the gaps between fibers 30 are filled in with deposit material, the video signal from infrared imaging means 26 becomes less well defined. As shown in FIG. 2, once the deposition is close to completion and the surface of workpiece 20 becomes relatively smooth, the correlation of the output versus the build up vanishes. At this point, a system user is made aware that the surface of workpiece 20 is relatively smooth by the lack of any video signal definition. (See FIG. 1 position C).

Figure 5:
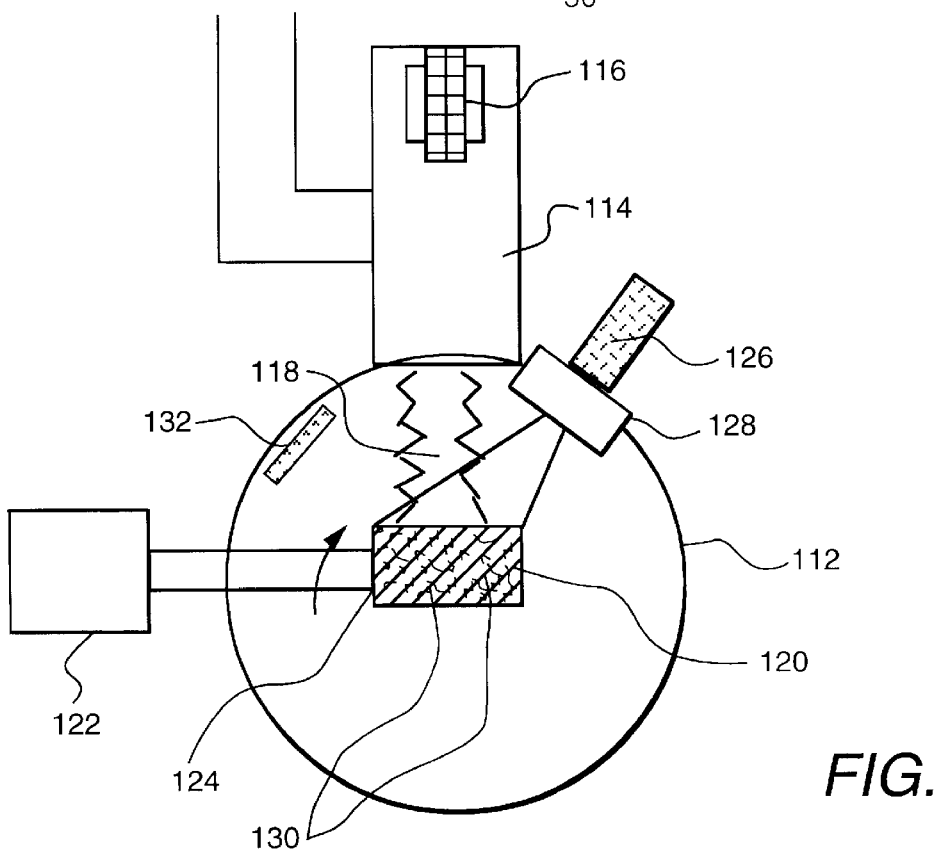
FIG. 5 is a schematic of a second embodiment of the instant invention.

Referring now to FIG. 5 of the drawings, a second embodiment of the instant invention is depicted. An apparatus for measuring deposit thickness on a workpiece 120 having a well defined roughness pattern, during composite materials production is shown, including a spray tank 112, which separates the spraying process from the surrounding environment. A plasma source 114, often a plasma gun, is shown positioned adjacent spray tank 112, with a powder injector 116 positioned therein for injecting a powder comprising a plurality of particles into a plasma plume 118.

The powder injected into plasma plume 118 may be of any type known to be suitable for use in plasma spray deposition processes, including both metallic and ceramic powders. The powder is brought to a molten state by plasma source 114 and impinges onto and adheres to workpiece 120, thus forming deposition on the target surface of workpiece 120. Workpiece 120 has a well defined roughness pattern and often comprises a plurality of fibers 130 wrapped about a mandrill 124.

Additionally, manipulator 122 is shown rigidly attached to mandrill 124. Manipulator 122 rotates mandrill 124 such that workpiece 120 can be completely exposed to plasma plume 118, generated from plasma source 114.

The system further includes a camera means 126 normally positioned external to spray tank 112, and positioned to view the entire deposit surface of workpiece 120, often using a view-point adjacent spray tank 112 through window 128. Camera means 126 is often a video camera tuned by a combination of detector selection and spectral filtering to respond to wavelengths emitted by the plasma plume 118 where the intensity of background radiation emitted by the plasma plume 118 is much greater than the radiation passively emitted by workpiece 120. An example of a suitable combination would be a video camera fitted with a charge injection device (CID) or a charge-coupled device (CCD) detector and an optical filter. For example, if Argon, a common constituent in plasma spray gas mixture were used, plasma plume 118 would emit radiation wavelengths between 670 and 672 nm. Therefore, a suitable combination for camera means 126 would be a video camera fitted with a silicone CID or CCD detector and an optical filter centered at 671±1 nm.

Camera means 126 monitors the wavelengths which are emitted by plasma plume 118 and reflected by workpiece 120. Camera means 126 identifies any increase in workpiece 120 intensity due to the increase in workpiece 120 surface reflectance as the spaces between the fibers 130 are filled with deposition. This increase in workpiece intensity and corresponding increase in workpiece reflectance can be related to the deposition thickness on workpiece 120 using a previously established correlation.

This system may further include one or more mirrors 132 selectively placed about spray tank 112 to direct more plasma radiation upon workpiece 120 to provide higher and more uniform levels of illumination for a system user.

In operation, plasma source 114 projects plasma plume 118 upon workpiece 120, depositing particulate upon the surface of workpiece 120, including fibers 130. Manipulator 122 rotates mandrill 124 which holds workpiece 120, such that workpiece 120 is completely exposed to plasma plume 118. Spray tank 112 separates the operation from the surrounding environment. Camera means 126, often positioned outside of spray tank 112, monitors the intensity of workpiece 120. Camera means 126 is filtered such that it only responds to wavelengths corresponding to those emitted by the plasma. When the surface of workpiece 120 is rough, the reflectance of the wavelengths of radiation from the plasma is low. However, as the particulate is deposited upon the surface of workpiece 120, and the gaps between fibers 130 are filled in, the surface reflectance of workpiece 120 increases. At this point, a system user monitoring the system tracks the change in reflectance until the increase in surface reflectance is in accordance with the proper deposition thickness, system user determining the proper amount of reflectance by using a predetermined reflectance/thickness correlation.

Figure 6:
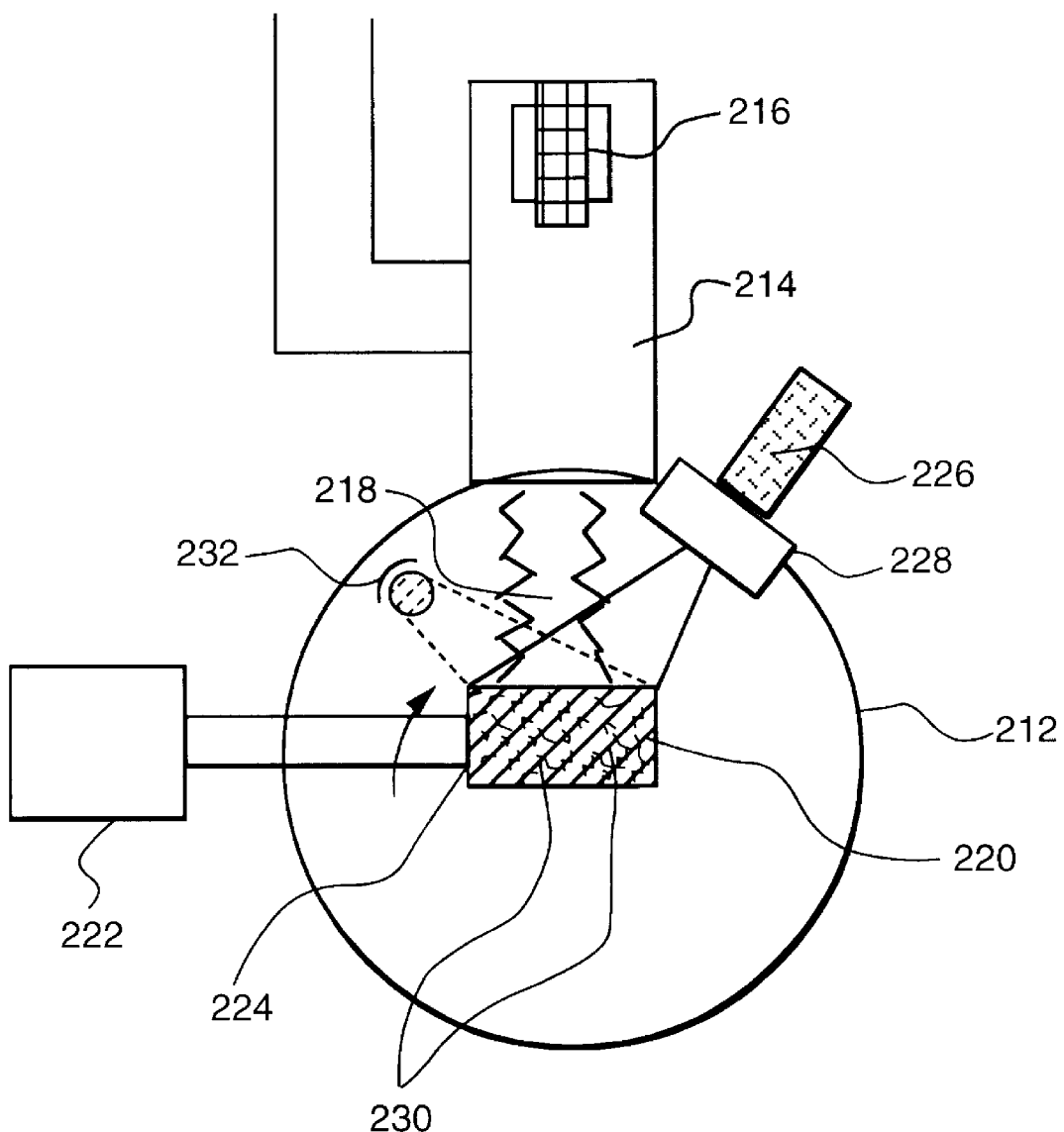
FIG. 6 is a schematic of a third embodiment of the instant invention.

Referring now to FIG. 6 of the drawings, a third embodiment of the instant invention is depicted. An apparatus for measuring deposit thickness on a workpiece 220 having a well defined roughness pattern, during composite materials production is shown, including a spray tank 212, which separates the spraying process from the surrounding environment. A plasma source 214, often a plasma gun, is shown adjacent spray tank 212, with a powder injector 216 positioned therein for injecting a powder comprising a plurality of particles into a plasma plume 218.

The powder injected into plasma plume 218 may be of any type known to be suitable for use in plasma spray deposition processes, including both metallic and ceramic powders. The powder is brought to a molten state by plasma source 214 and impinges onto and adheres to workpiece 220, thus forming deposition on the target surface of workpiece 220. Workpiece 220 has a well defined roughness pattern and often comprises a plurality of fibers 230 wrapped about a mandrill 224.

Additionally, a manipulator 222 is shown rigidly attached to a rotating mandrill 224. Manipulator 222 rotates mandrill 224 such that workpiece 220 can be completely exposed to plasma plume 218, generated from said plasma source 214.

An external light source 232 is positioned adjacent spray tank 212, capable of providing a high spectral intensity illumination of workpiece 220 in relation to the intensity of the plasma or of workpiece 220 itself. For example, a laser or a gas discharge lamp such as a sodium lamp would be sufficient.

The system further includes a camera means 226 normally positioned external to spray tank 212, and positioned to view the entire deposit surface of workpiece 220, often using a view-point adjacent said spray tank 212 and through window 228. Camera means 226 is often a video camera tuned by a combination of detector selection and spectral filtering to respond to a narrow band of wavelengths produced by external light source 232, where the intensity of background radiation emitted by the plasma plume 218 or passively by workpiece 220 itself is much less than the radiation emitted by external light source 232. An example of a suitable combination would be a video camera fitted with a charge injection device (CID) or a charge-coupled device (CCD) detector and a narrow band spectral filter for a sodium lamp illumination source. For example, a video camera fitted with a silicone CID or CCD detector with a narrow band filter set at 589±1 nm for a sodium lamp illumination source which emits radiation wavelengths between 588 and 590 nm.

Camera means 226 monitors the wavelengths which are emitted by external light source 232 and reflected by workpiece 220. Camera means 226 identifies any increase in workpiece 220 intensity due to the increase in workpiece 220 surface reflectance as the spaces between the fibers are filled with deposition. This increase in workpiece 220 intensity and corresponding increase in workpiece reflectance can be related to the deposition thickness on workpiece 220 using a previously established correlation.

In operation, plasma source 214 projects plasma plume 218 upon workpiece 220 depositing particulate upon the surface of workpiece 220 fibers 230. Manipulator 222 rotates mandrill 224 which holds workpiece 220, such that workpiece 220 is completely exposed to plasma plume 218 . Spray tank 212 separates the operation from the surrounding environment. Camera means 226, regularly positioned external to spray tank 212, monitors the intensity of workpiece 220. External light source 232 projects a narrow band of radiation at the surface of workpiece 220. Camera means 226 is filtered such that it only responds to wavelengths corresponding to those emitted by external light source 232.

When the surface of workpiece 220 is rough, the reflectance of the wavelengths of radiation from external light source is low. However, as the particulate is deposited upon the surface of workpiece 220, and the gaps between fibers 230 are filled in, the surface reflectance of workpiece 220 increases. At this point, a system user monitoring the system tracks the change in reflectance until the increase in surface reflectance is in accordance with the proper deposition thickness, system user determining the proper amount of reflectance by using a predetermined reflectance/thickness correlation.

EXAMPLE

In this example, a video recording was made of the fibers wound on a mandrel prior to, and after spraying. Two modes of illumination, consistent with the instant invention, were employed.

In the first, an external light source was used to illuminate the workpiece. In the second, the workpiece was strictly illuminated by the plasma. In both series of runs, the camera means was positioned externally to the spray tank and the image of the workpiece was enhanced by the use of a zoom lens, as would be the case in the instant invention. The external light source was employed at near normal incidence to the mandrel.

Figure 7:
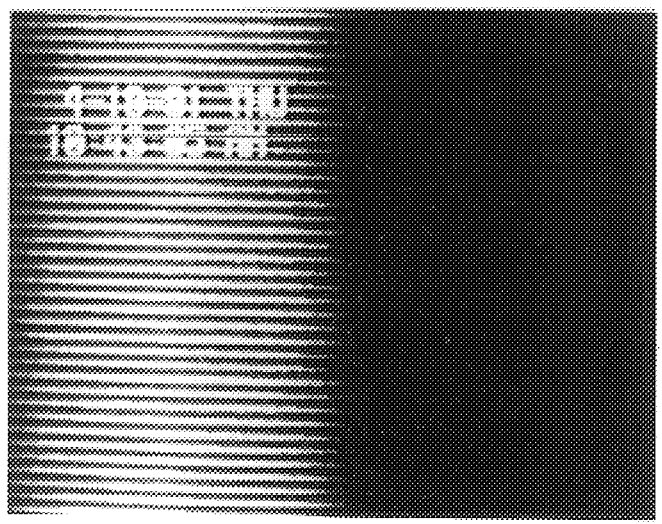
FIG. 7 is a photographic representation of a sample surface prior to a flame spraying process.
Figure 8:
FIG. 8 is a photographic representation of a sample surface after the flame spraying process has been completed.
Figure 9:
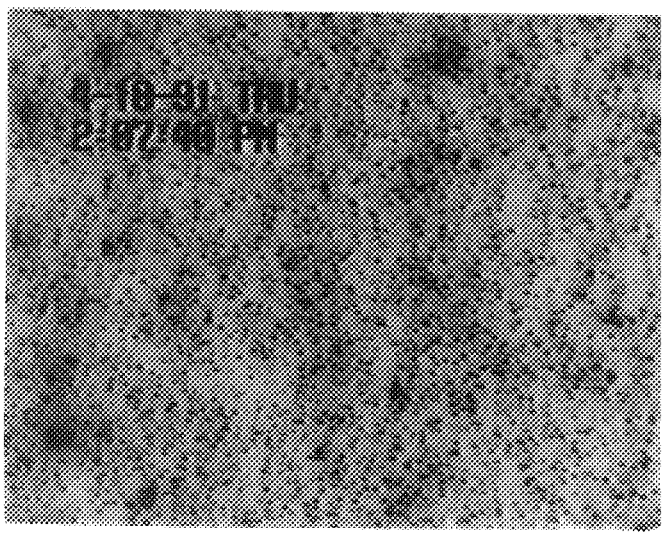
FIG. 9 is a negative image of FIG. 8.

The attached video frames illustrate several aspects of the instant invention. FIG. 7 illustrates the ability of the camera means to fully discern the individual fibers (the dark lines indicating that each fiber is about 5 mils in diameter) with the mandrel stationary and illuminated by external light source. FIG. 8 illustrates the "as sprayed" surface after the completion of the spraying. Note that the surface features smaller than 1 mil can be discerned clearly with no periodicity due to the fibers evident. FIG. 9 is simply a negative of FIG. 8. The sprayed material was Ti-6-4 and the powder was sieved to a mean size of 140 microns. The rotation rate of the mandrel during this event was 150 rpm's and an argon-helium plasma was employed for the purpose.

Figure 10:
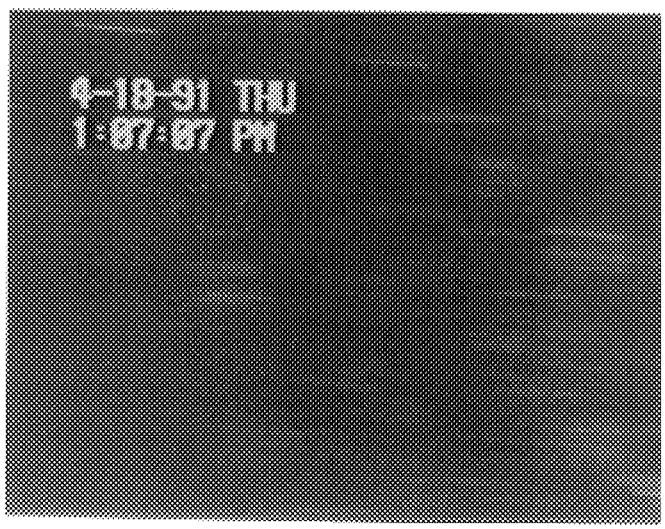
FIGS. 10–12 are photographic representations which illustrate the images taken with the available plasma light, after deposition process has been completed, using various rates of electronic shuttering.
Figure 11:
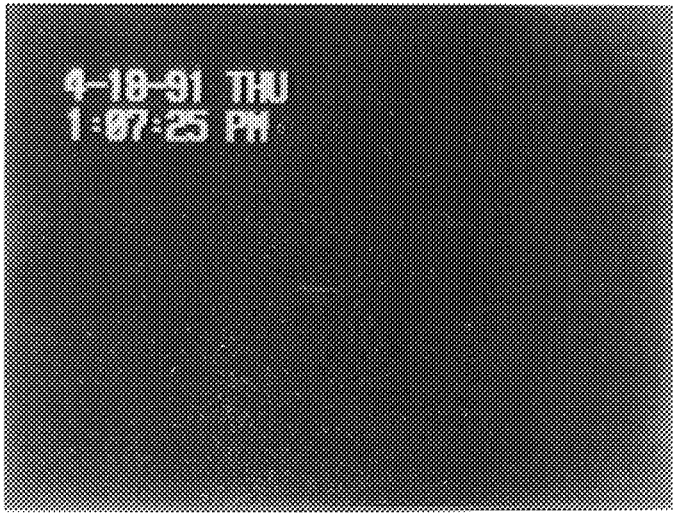
Figure 12:
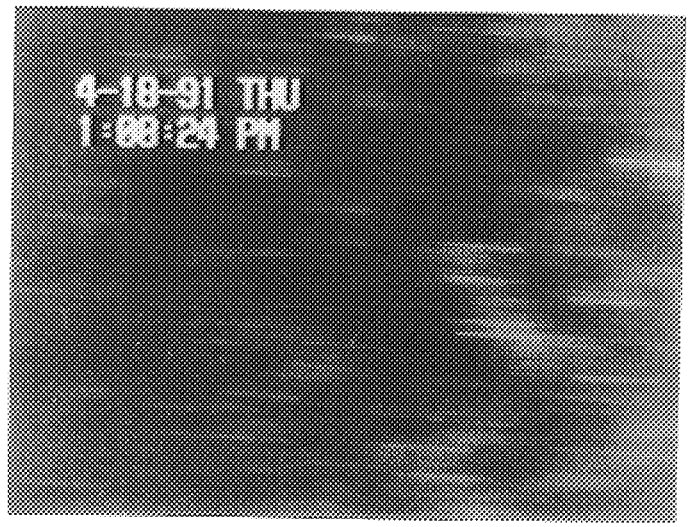

FIGS. 10–12 illustrate the images of the workpiece taken with the available plasma light using electronic shuttering of 1/1000 s and 1/2000 s exposures. In this test, no preheating of the mandrill occurred and since the plasma illumination of imaged area of the mandrel is oblique, little could be observed of the surface until a substantial deposit had occurred and small surface asperities could act to scatter light to the camera. Also, direct emission from the surface provided some intensity contribution near the end of the run. With a monochrome camera without infrared blocking, this contribution would have been significant, however without mandrill preheat the infrared will not provide useful intensity during the initial deposition process.

The motion blurring at 1/2000 is about 30 mils, but since this loss in spatial resolution is perpendicular to the axis in which fiber periodicity is measured, the effect may be tolerable. In any event, electronic shuttering to 1/10000 s is possible to reduce this blurring. In the visible wavelengths, the plasma is very bright with this optical arrangement even at 1/2000 s exposure, suggesting that the plasma could be used as an illumination source at faster shutter speeds if the light is redirected to near normal incidence (i.e. an internal gas purged mirror).

These results demonstrate that individual fibers can be spatially resolved with practical equipment and that irradiated intensity profiles across the monotape surface are characterized by substantial changes in periodicity and amplitude between the initial and final states. It has also been shown that adequate spatial resolution during processing can be achieved with modest shutter speeds available with current generation CCD detectors. These results buttress the information given that individual fibers and the level of filling by sprayed molten metal powder can be discerned and measured on line using either indirect illumination or by the Infrared radiation of the target surface.

The foregoing has described several embodiments of an apparatus to measure deposit thickness during composite materials production. While specific embodiments of the present invention have been described, it will be apparent to those skilled in the art that various modifications thereto can be made without departing from the spirit and scope of the invention as defined in the appended claims.

We claim:

1. An apparatus for measuring deposit thickness on a workpiece during composite materials production, comprising:
   a spray tank for separating said composite materials production from the surrounding environment;
   a plasma source adjacent said spray tank for generating a plasma plume;
   an infrared imaging means positioned external to said spray tank to view said workpiece during deposition of said powder; and
   said infrared imaging means measuring the deposit thickness upon said workpiece by monitoring radiation wavelengths passively emitted by said workpiece and relating any reduction in workpiece intensity due to a reduction in surface emissivity with the deposit thickness on the workpiece using a previously established correlation, as said workpiece smoothes out during deposition.

2. An apparatus for measuring deposit thickness on a workpiece during composite materials production, in accordance with claim 1, wherein said plasma source is a plasma gun.

3. An apparatus for measuring deposit thickness on a workpiece during composite materials production, in accordance with claim 1, further comprising a powder injector, within said plasma source, for injecting said powder into said plasma plume.

4. An apparatus for measuring deposit thickness on a workpiece during composite materials production, in accordance with claim 1, wherein said workpiece comprises a plurality of fibers wrapped about a mandrel.

5. An apparatus for measuring deposit thickness on a workpiece during composite materials production, in accordance with claim 1, wherein said infrared imaging means is tuned by a combination of detector selection and spectral filtering to respond only to wavelengths which are passively emitted by said workpiece itself in monitoring the emissivity of said workpiece.

6. An apparatus for measuring deposit thickness on a workpiece during composite materials production, in accordance with claim 5, wherein said infrared imaging means is an infrared imaging radiometer which only detects wavelengths emitted by said workpiece which are greater than three microns in monitoring the emissivity of said workpiece.

7. An apparatus for measuring deposit thickness on a workpiece during composite materials production, in accordance with claim 6, wherein said infrared imaging radiometer is an imaging radiometer using a mercury cadmium telluride detector optimized for 2.0–5.0 micron response coupled to a 4.8 micron long-pass filter.

8. An apparatus for measuring deposit thickness on a workpiece during composite materials production, in accordance with claim 1, wherein said infrared imaging means is an infrared camera.

9. An apparatus for measuring deposit thickness on a workpiece during composite materials production, in accordance with claim 8, wherein said infrared camera is one using a pyroelectric video detector filtered to block wavelengths less than 3 microns.

10. An apparatus for measuring deposit thickness on a workpiece during composite materials production, in accordance with claim 1, further comprising:
    a mandrel for holding said workpiece; and
    a manipulator rigidly attached to said mandrel for rotating said mandrel within said spray tank such that said workpiece may be completely exposed to said plasma plume.

11. An apparatus for measuring deposit thickness on a workpiece during composite materials production, comprising:
    a spray tank for separating said composite materials production from a surrounding environment;
    a plasma source adjacent said spray tank for generating a plasma plume;
    a mandrel for holding said workpiece;
    a manipulator rigidly attached to said mandrel for rotating said mandrel within said spray tank such that said workpiece may be completely exposed to said plasma plume;
    an infrared imaging radiometer positioned external to said spray tank to view said workpiece during deposition of said powder; and
    said infrared imaging radiometer measuring the deposit thickness upon said workpiece by monitoring the wavelengths which are passively emitted by said workpiece, relating any reduction in the intensity of said workpiece due to a reduction in surface emissivity with the deposit thickness on the workpiece using a previously established correlation, as said workpiece smoothes out during deposition.

12. An apparatus for measuring deposit thickness on a workpiece during composite materials production, in accordance with claim 11, wherein said infrared imaging radiometer is tuned by a combination of detector selection and spectral filtering to respond only to wavelengths which are passively emitted by said workpiece itself.

13. An apparatus for measuring deposit thickness on a workpiece during composite materials production, in accordance with claim 11, wherein said infrared imaging radiometer excludes wavelengths less than approximately 3 microns to eliminate plasma background radiation interference.

14. An apparatus for measuring deposit thickness on a workpiece during composite materials production, in accordance with claim 11, further comprising a window positioned within said spray tank said window allowing radiation in a wavelength within the range of interest to pass through to said externally positioned infrared imaging radiometer.

15. An apparatus for measuring deposit thickness on a workpiece during composite materials production, in accordance with claim 14, wherein said window is made of sapphire.

16. An apparatus for measuring deposit thickness on a workpiece during composite materials production, comprising:
    a spray tank for separating said composite materials production from the surrounding environment;
    a plasma source adjacent said spray tank for generating a plasma plume;
    a camera means positioned external to said spray tank for viewing the workpiece surface; and said camera means measuring the deposit thickness upon said workpiece by monitoring the radiation wavelengths which are reflected by said workpiece and relating any increase in workpiece intensity due to an increase in workpiece surface reflectance with the deposit thickness on the workpiece using a previously established correlation, as said workpiece smoothes out during deposition; wherein said camera means uses the reflected background radiation provided by the plasma to measure the deposit thickness.

17. An apparatus for measuring deposit thickness on a workpiece during composite materials production, in accordance with claim 16, wherein said camera means is tuned to respond to wavelengths where the intensity of background radiation emitted by the plasma is much greater than the radiation passively emitted by the workpiece.

18. An apparatus for measuring deposit thickness on a workpiece during composite materials production, in accordance with claim 17, wherein said tuning is done through a combination of detector selection and spectral filtering.

19. An apparatus for measuring deposit thickness on a workpiece during composite materials production, in accordance with claim 16, further comprising one or more mirrors, positioned around said workpiece to direct more plasma radiation upon said workpiece to provide higher and more uniform levels of illumination for said camera means.

20. An apparatus for measuring deposit thickness on a workpiece during composite materials production, in accordance with claim 16, wherein said camera means is a video camera fitted with a silicone charge injection device.

21. An apparatus for measuring deposit thickness on a workpiece during composite materials production, in accordance with claim 16, wherein said camera means is a video camera fitted with a silicone charge coupled device.

22. An apparatus for measuring deposit thickness on a workpiece during composite materials production, in accordance with claim 16, further comprising:

a mandrel for holding said workpiece; and a manipulator rigidly attached to said mandrel for rotating said mandrel within said spray tank such that said workpiece may be completely exposed to said plasma plume.

23. An apparatus for measuring deposit thickness on a workpiece during composite materials production, in accordance with claim 16, wherein said camera means monitors the radiation wavelengths which are emitted by said plasma plume and reflected by said workpiece.

24. An apparatus for measuring deposit thickness on a workpiece during composite materials production, comprising:

a spray tank for separating the composite materials production from the surrounding environment;

a plasma source adjacent said spray tank for generating a plasma plume;

a mandrel for maneuvering said workpiece within said plasma plume;

a manipulator rigidly attached to said mandrel for rotating said mandrel within the spray tank such that said workpiece may be completely exposed to said plasma plume;

a video camera positioned external to said workpiece for viewing the workpiece surface; and said video camera measuring the deposit thickness upon said workpiece by monitoring the radiation wavelengths which are emitted by said plasma plume and reflected by said workpiece and relating any increase in workpiece intensity due to an increase in workpiece surface reflectance with the deposit thickness on the workpiece using a previously established correlation, as said workpiece smoothes out during deposition.

25. An apparatus for measuring deposit thickness on a workpiece during composite materials production, in accordance with claim 24, further comprising an external light source, wherein said camera means uses the reflected background radiation provided by said external light source to measure the deposit thickness.

26. An apparatus for measuring deposit thickness on a workpiece during composite materials production, in accordance with claim 25, wherein said camera means is tuned to respond to wavelengths where the intensity of background radiation emitted by the plasma is much greater than the radiation passively emitted by the workpiece.

27. An apparatus for measuring deposit thickness on a workpiece during composite materials production, in accordance with claim 26, wherein said tuning is done through a combination of detector selection and spectral filtering.

28. An apparatus for measuring deposit thickness on a workpiece during composite materials production, in accordance with claim 25, further comprising one or more mirrors, positioned around said workpiece to direct more plasma radiation upon the workpiece to provide higher and more uniform levels of illumination for the camera means.

29. An apparatus for measuring deposit thickness on a workpiece during composite materials production, in accordance with claim 25, wherein said camera means is a video camera fitted with a silicone charge injection device.

30. An apparatus for measuring deposit thickness on a workpiece during composite materials production, in accordance with claim 25, wherein said camera means is a video camera fitted with a charge coupled device.

31. An apparatus for measuring deposit thickness on a workpiece during composite materials production, in accordance with claim 25, further comprising:

a rotating mandrel for maneuvering said workpiece within said plasma plume; and a manipulator rigidly attached to said mandrel for rotating said mandrel within the spray tank such that said workpiece may be completely exposed to said plasma plume.

32. An apparatus for measuring deposit thickness on a workpiece during composite materials production, comprising:

a spray tank for separating the deposition process from the surrounding environment;

a plasma source adjacent said spray tank for generating a plasma plume;

a mandrel for maneuvering said workpiece within said plasma plume;

a manipulator rigidly attached to said mandrel for rotating said mandrel within the spray tank such that said workpiece may be completely exposed to said plasma plume;

a video camera positioned external to said workpiece for viewing the workpiece surface; and said video camera measuring the deposit thickness upon said workpiece by monitoring the radiation wavelengths which are emitted by an external light source and reflected by said workpiece and relating any increase in workpiece intensity due to an increase in workpiece surface reflectance with the deposit thickness on the workpiece using a previously established correlation, as said workpiece smoothes out during deposition.

* * * * *